Sept. 24, 1946.  O. JACOBSEN  2,408,314
SHAFT SEAL
Filed Oct. 4, 1943  2 Sheets-Sheet 1

INVENTOR
OYSTEIN JACOBSEN
BY
Toulmin and Toulmin
ATTORNEYS

Sept. 24, 1946.        O. JACOBSEN        2,408,314
SHAFT SEAL
Filed Oct. 4, 1943        2 Sheets-Sheet 2
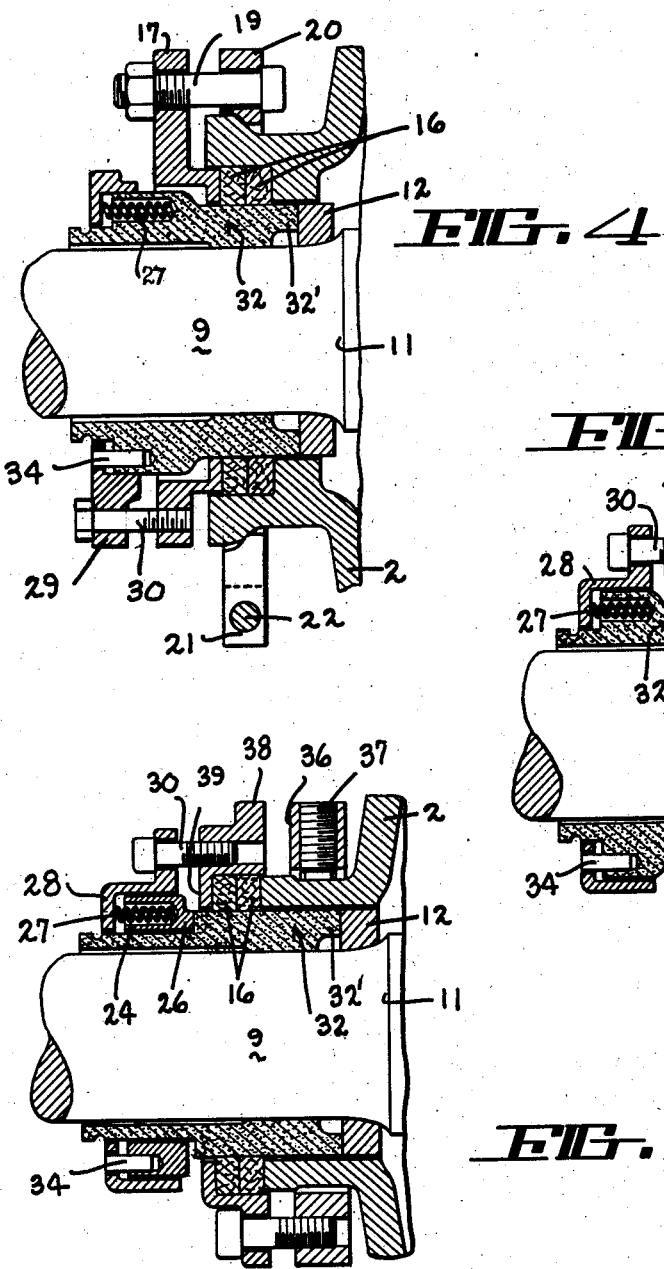
INVENTOR
OYSTEIN JACOBSEN
BY
Toulmin and Toulmin
ATTORNEYS Patented Sept. 24, 1946

2,408,314

UNITED STATES PATENT OFFICE 2,408,314

SHAFT SEAL

Oystein Jacobsen, Montgomery County, Ohio, assignor to The Duriron Company, Inc., Dayton, Ohio, a corporation of New York Application October 4, 1943, Serial No. 504,824

3 Claims. (Cl. 286—7)

The present invention relates to centrifugal pumps and more particularly to the seals of those pumps designed to operate at considerable velocities and which are adapted to handle corrosive fluids.

When employing a pump for conveying acid-containing solutions all parts of the pump which come into contact with the corrosive liquid are usually fabricated of non-attackable metal such as silicon iron. Metal of this character is so hard that it is practically unmachinable so that it is necessary for the pump shafts and bearings to be made of a machinable metal such as high carbon steel and to take unusual precaution in preventing the acid from reaching the shaft. In many standard forms of pumps, the impeller is mounted on an overhanging journal which is usually constituted of two or more sets of ball bearings and in which the inner ball bearing is positioned not far from the impeller. This consideration makes it all the more essential that the interior of the casing shall be effectively sealed from the shaft which extends beyond the casing toward the ball bearings, so that none of the liquid can reach the bearings to impair their effectiveness.

The corrosive fluid may reach the shaft and the ball bearings through creepage either in a direction longitudinally of the shaft or in a direction laterally of the shaft and past rotary or thrust bearings, so that the requirements of a good seal which prevents the fluid from reaching the pump shaft regardless of the direction in which the fluid might normally creep are extremely critical and exacting. It is apparent that if too much pressure is applied to the seal or the packing box undue friction will be produced, which causes excessive wear as well as dissipation of power.

The primary object of the invention is to provide an improved seal for pumps which operate with pressure fluids and which seal effectively serves to prevent the flow of fluid from the interior of the pump casing and in any direction, radial, longitudinal or otherwise.

Another object is to provide a seal which lends itself peculiarly well to the prevention of flow of corrosive fluids and liquids from a centrifugal pump along the impeller shaft where the fluid or liquid would eventually attack the bearings.

Still another object is to provide a combined longitudinal and thrust seal which may be readily placed in position and given proper adjustment during operation of the pump.

These objects are attained, in brief, by providing a collar on the pump shaft and causing the seal elements to bear against the collar by means of a stationary structure which resiliently holds the elements in position.

Figure 4 is a sectional view partly in elevation and showing a modified form of the improved seal while Figures 5 and 6 illustrate still other forms that the seal may advantageously take.

Figure 1:
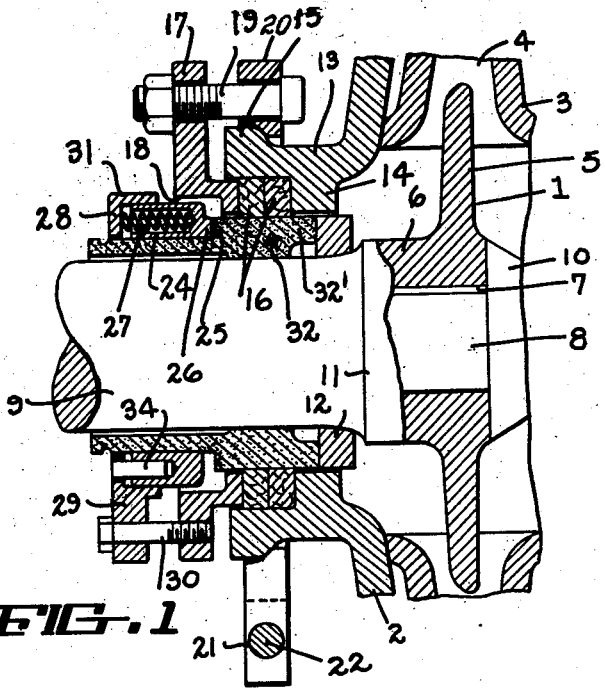
Figure 1 is a longitudinal section of one form of the improved seal and embodying some of the principles of the present invention. This view is taken along line 1—1 of Figure 2 with a few parts in elevation.

Referring more particularly to Figure 1, reference character 1 designates the impeller of a high pressure centrifugal pump contained within a housing or casing 2 of which a fragmentary portion only has been illustrated. The impeller is of the double shrouded or closed type, the shroud being indicated at 3 on opposite sides of the blades or vanes 4. The latter are secured to a centrally disposed web 5 which radiates from a hub 6. This hub is keyed as indicated at 7 to the turned down portion 8 on a shaft 9. The shaft portion 8 may be provided with a threaded end to receive an impeller nut 10 for holding the impeller against the shoulder 11 of the shaft 9. Immediately to the left of the shoulder 11 there is positioned a sealing collar 12 which may be secured to the main shaft portion 9 in any suitable manner, for instance, by a sweating, welding or by a clamping effect. If desired, this collar may be formed integral with the shaft although in general I prefer to provide it as a separate unit and then to secure it in any suitable and well-known manner to the shaft.

Figure 2:
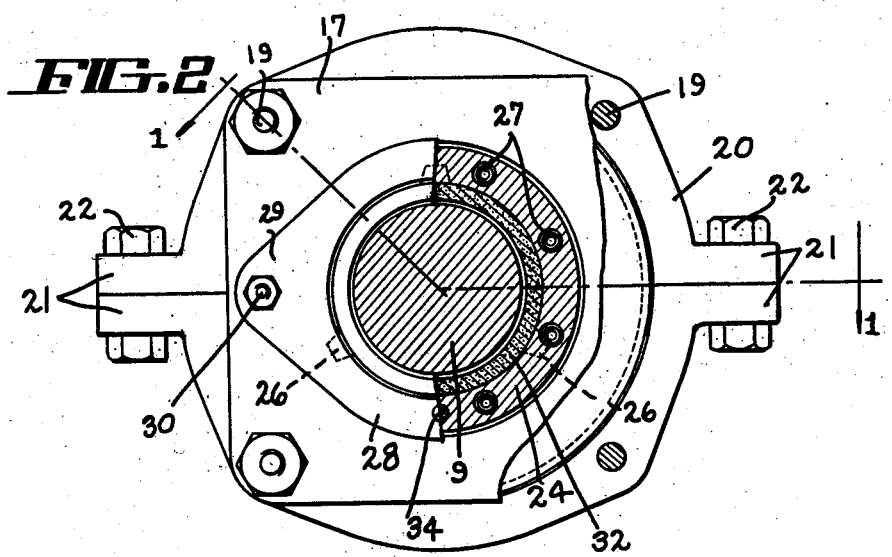
Figure 2 is an elevational view of the seal illustrated in Figure 1 but broken away to show the normally hidden parts.
Figure 3:
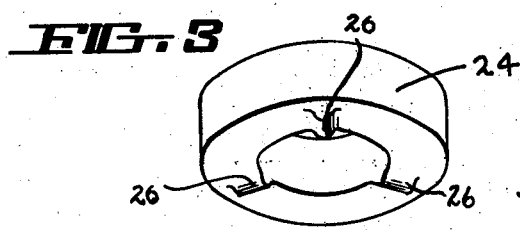
Figure 3 is a perspective view of the spring retainer ring element forming part of the general seal combination.

The pump casing 2 is provided with a longitudinally extending tubular portion 13 which terminates at the left hand end in an enlarged humped portion 15. The tubular portion 13 of pump casing is provided with an inwardly extending flange 14 having an internal diameter just slightly larger than the exterior diameter of the collar 12. The annular projection 14 extends in the longitudinal direction for a distance less than the length of the tubular portion 13, thus leaving an annular recess on the inside of the tubular member between the projection 14 and the left hand surface of the enlarged portion 15. This annular recess is adapted to receive two or more packing rings 16 made preferably of synthetic rubber or any other suitable material. It has been found that material sold under the name of neoprene, Perbunan and Thiokol is satisfactory for this purpose. The packing rings 16 are held in position by means of a pressure gland 17 which has a general rectangular configuration as shown in Figure 2 and is provided with a circular opening 18 from which a ring-like extension projects longitudinally into the annular recess formed within the tubular member 13 and thus presses against the packing rings 16. The packing gland 17 is adjustably held in position as by the bolts 19 (Figure 2) by means of a split ring or plate 20 provided at each side with lugs 21 which can be bolted together as indicated at 22. The split ring 20 is given a shape at its interior diameter such as snugly to fit over the humped portion 15 of the casing so that as the split ring portions are bolted together at 22, the packing gland 17 may be held rigidly in position by means of the bolts 19. It is apparent that by tightening the bolts the pressure on the packing rings 16 may be adjusted. The opening 18 in the packing gland 17 forms a recess of annular shape for receiving a spring retainer ring 24, a perspective view of which is illustrated in Figure 3. The lower or right hand end of the ring if provided with a plurality of projections (three as shown) equidistantly spaced about the ring for giving the ring a three point suspension with respect to the abutting shoulder 25 of the graphite sealing member which will be described presently. A number of equidistantly positioned countersunk openings are drilled into the ring from the side opposite the projection 26, these openings being for the purpose of retaining a plurality of compression springs 27 which normally extend beyond the left hand edge of the ring.

In order to apply pressure equally to the springs 27 a retaining plate 28 is provided, this plate having generally a ring-shaped configuration except for two oppositely disposed wing portions 29 which are adapted to receive bolts 30 (Figure 2). These bolts are secured in suitably positioned openings in the packing gland 17. The retaining plate 28 is provided with a longitudinally extending flange indicated at 31 which fits snugly over the spring retaining ring 24. Consequently by tightening the bolts 30 the amount of pressure applied to the springs 27 may be adjusted and this in turn causes the spring retainer ring 24 to be forced to the right (Figure 1) against the graphite sealing ring 32.

It will be noted that each of the springs 27 is contained within a pocket completely closed on all sides by the retaining ring 24 and the retaining plate 28, so that the springs are effectively sealed against corrosive liquors and fumes in the event that any fluid under pressure creeps along the shaft 9 past the sealing ring 32 or in any manner moves past the packing ring 16. This is a very important consideration when using pumps designed to place corrosive liquors under pressure and the fumes therefrom tend to creep past or permeate through any object that comes into contact with the liquor or fumes.

The sealing ring takes the form of an extended cylinder having different outer and inner diameters throughout its length and the general purpose of which is to prevent creepage of corrosive fluid either longitudinally along the shaft 9 or radially along the left hand surface of the collar 12. The interior diameter of the graphite seal 32 is somewhat larger than the shaft 9 except for a portion indicated at 32 which fits the shaft 9 snugly. It has been explained that the seal member 32 has been provided with a shoulder 25 and the longitudinal distance between this shoulder and the right hand end of the seal member is such that when pressure is applied to the spring 27 the member 32 will be forced against the left hand side of collar 12 as is shown in Figure 1. It is apparent that the collar must rotate with the shaft 9 but the graphite seal 32 and the associated parts are held stationary against rotation and the only relative movement which takes place is between the right hand surface of the seal member 32 and the left hand surface of the collar. In order to prevent any possibility of the spring retainer ring 24 from even slightly rotating, it may be desirable to insert a pin 34 into the left side of the ring 24 from the retaining plate 28.

It is apparent that the various parts of the shaft seal described up to this point may be readily assembled, disassembled and easily adjusted to provide as much friction as is necessary or desired between the graphite seal member 32 and the collar 12 or with the shaft 9. The effect of the graphite seal is primarily to prevent even the slightest leakage of the corrosive fluid along the shaft 9 and in addition to reduce friction as much as possible by providing a lubricant at the contact surfaces. Any slight leakage from the outside to the inside of the sealing ring 12 along the left hand surface is effectively prevented from traveling longitudinally of the shaft 9 by the closest of contact between the shoulder 32' of the seal member with the shaft 9. Any fluid that tends to creep along the outer diameter of the collar, then onto the outer surface of the graphite seal 32 is immediately prevented from proceeding further by the packing rings 16. It is evident that as the seal member 32 shows signs of wear such as pitting, etc., it may be readily replaced by simply removing the bolts 30 in order to slide the retainer ring 24 out of position and then loosen the nuts of the bolts 19, in order to remove any circumferential pressure between the packing rings 16 and the graphite seal member 32.

The structure shown in Figure 4 differs mainly from that described in connection with Figure 1 in that the spring retainer ring 24 is formed integral with the graphite seal member 32 instead of being comprised of a separate member as in the case of Figure 1. Thus in Figure 4 the seal member 32 is given a shape at its left hand end as to accommodate the countersunk openings in which the springs are placed. The latter serve exactly the same function as in Figure 1 in that as the retaining plate 29 is moved to the right by tightening the bolts 30, pressure is exerted at the bottom of the countersunk opening by the respective springs 27 which forces the graphite seal member 32 against the left hand surface of the sealing ring 12.

Figure 5 shows approximately the same type of graphite seal member 32 as was explained in connection with Figure 4 but the main difference is in the manner in which the packing gland 17 of Figure 1 is supported from the pump casing and also in the manner in which pressure is supplied to the packing rings 16 by the packing gland. In Figure 5, the pump casing 2 is provided with a longitudinally extending tubular portion 13 as in the case of Figure 1 but the hump or enlarged end is smaller than that shown in the other figures. A screw collar 36 having an internal diameter somewhat larger than the enlarged end of the tubular portion 13 is provided. This screw collar has three or more equidistantly spaced headless set screws 37 which extend radially through the collar and thus hold the latter rigidly in position between the enlarged end of the pump casing and the main portion of the casing. It is apparent that the collar 36 need not be of the split type because it will slide readily over the enlarged portion of the tubular extension 13. The packing gland 38 in Figure 5 has a different shape from that described in connection with Figure 1 in that the portion thereof which contacts with the packing rings now extends to the left instead of to the right as in the earlier figure. This change in structure is necessitated by the fact that the packing rings abut the left hand end of the tubular casing portion 13 instead of being received by an annular recess within the casing. The packing gland 38 is held in longitudinal position by a plurality of bolts 40 of which only one has been shown in Figure 5, all equidistantly spaced about the screw collar 36. As in the case of Figure 1, the spring retainer ring 28 is held in position by means of bolts 30 extending from the retainer ring to the packing gland 38. The structure shown in Figure 5 has the advantage over those described in connection with Figures 1 and 4 as being somewhat more simplified in design. The necessity for making the support ring 20 in split form, thereby necessitating the bolts 22 and the associated lugs 21 is avoided, and instead a screw collar 36 of complete circular continuity is employed. The packing rings 16 in Figure 5 are more accessible than the structures shown in Figures 1 and 4. Moreover, all of the contact adjustments between the graphite seal 32 and the collar 12, also the pressure adjustments of the packing rings 16 are just as much available in the structure shown in Figure 5 as in the case of Figures 1 and 4.

Figure 6 differs in structure from that shown in Figure 5 mainly in separating the spring retainer ring 28 from the graphite seal 32 and at the same time retaining the advantages of the circularly complete screw collar 36. As in the case of Figure 1 the spring retainer ring 24 may be made of metal and projections 26 (Figure 3) may be provided to give a three point support between the retainer ring and the adjacent shoulder in the graphite seal member 32.

It is apparent that in case the pump with a seal as described is intended to be employed in connection a high pressure fluid of the corrosive type, such as an acid-containing liquid, all of the parts of the pump which come into contact with this liquid should be made of a non-attackable metal such as high silicon iron. This would, of course, include the impeller, the shroud 3 and the casing 2, and also if desired, the collar 12 could be made of this metal. None of the parts mentioned require any exact fitting or machining operating so that their being made of a non-machinable metal will not present any particular problems. All the remaining parts of the seal with the exception of the graphite member 32 and the packing rings 16 are preferably made of a readily machinable metal so that the necessary bolt holes and spring openings may be readily provided.

It will be understood that I desire to comprehend within my invention such modifications as come within the scope of the claims and the invention.

Having thus fully described my invention, what I claim as new and desire to secure by Letters Patent is:

1. A seal for the shaft of a fluid pressure pump, said shaft being adapted to carry an impeller contained within a casing, a sealing collar on said shaft and secured thereto, a sealing ring adapted to surround the shaft and bear against the collar, means for applying pressure endwise to the sealing ring, said means comprising a retaining ring which surrounds said sealing ring and contains a plurality of compression springs arranged around the retaining ring and contained in compartments, and a retaining plate overlying said compartments to close the same.

2. A seal for the shaft of a fluid pressure pump, said shaft being adapted to carry an impeller contained within a casing, a sealing collar on said shaft and secured thereto, a sealing ring adapted to surround the shaft and bear against the collar, means for applying pressure endwise to the sealing ring, said means comprising a retaining ring positioned about the sealing ring and having equidistantly spaced recesses extending to the rear of the retaining ring, a plurality of springs in said recesses and means for holding said springs in position and for sealing said springs away from the sealing ring and the shaft, said last mentioned means comprising a flanged collar, a part of which fits about the retaining ring and overlies said recesses to close the same, said flanged collar being adjustable to maintain varying degrees of compression on said springs.

3. A seal for a fluid pressure pump comprising a sealing collar, a graphite sealing ring adjacent said sealing collar, both said sealing collar and said sealing ring positioned adjacent pump casing, packing means consisting of at least one packing ring concentrically arranged around said sealing ring and bearing against the pump casing; and means for applying pressure endwise of said packing means and to said sealing ring comprising a retaining ring surrounding said sealing ring and positioned axially inwardly of the outer end thereof, said retaining ring having a plurality of lugs positioned on the inner end thereof for bearing against a radial surface of said sealing ring.

OYSTEIN JACOBSEN.